United States Patent
Kim et al.

(10) Patent No.: US 10,257,744 B2
(45) Date of Patent: Apr. 9, 2019

(54) METHOD FOR CANCELING INTERFERENCE IN WIRELESS COMMUNICATION SYSTEM AND APPARATUS THEREFOR

(71) Applicant: LG ELECTRONICS INC., Seoul (KR)

(72) Inventors: Eunsun Kim, Anyang-si (KR); Jonghyun Park, Anyang-si (KR); Hanbyul Seo, Anyang-si (KR); Kijun Kim, Anyang-si (KR); Hyungtae Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/772,037

(22) PCT Filed: Sep. 4, 2013

(86) PCT No.: PCT/KR2013/007972
§ 371 (c)(1),
(2) Date: Sep. 1, 2015

(87) PCT Pub. No.: WO2014/157786
PCT Pub. Date: Oct. 2, 2014

(65) Prior Publication Data
US 2016/0021565 A1    Jan. 21, 2016

Related U.S. Application Data

(60) Provisional application No. 61/805,919, filed on Mar. 27, 2013, provisional application No. 61/810,685, (Continued)

(51) Int. Cl.
*H04W 4/00* (2018.01)
*H04W 28/04* (2009.01)
(Continued)

(52) U.S. Cl.
CPC .......... *H04W 28/04* (2013.01); *H04B 7/0456* (2013.01); *H04B 17/345* (2015.01);
(Continued)

(58) Field of Classification Search
CPC .................................................. H04W 28/048
See application file for complete search history.

(56) References Cited

U.S. PATENT DOCUMENTS 9,066,358 B2 * 6/2015 Ohwatari ............. H04B 7/0865
9,210,592 B2 * 12/2015 Davydov ............. H04B 7/0689
(Continued)

FOREIGN PATENT DOCUMENTS

CA    2826790 A1    8/2012
CN    101827053 A    9/2010
(Continued)

OTHER PUBLICATIONS

New Postcom: "Remaining details of EPDCCH starting symbol configuration", R1-124796, 3GPP TSG RAN WG1 Meeting #71, New Orleans, USA, Nov. 12-16, 2012.
(Continued)

*Primary Examiner* — Guang W Li
(74) *Attorney, Agent, or Firm* — Dentons US LLP

(57) ABSTRACT

According to an embodiment of the present invention, disclosed is a method for supporting, by a serving base station, cancellation of interference signals from signals received at a target terminal in a wireless communication system. The method comprises the steps of: receiving scheduling information of at least one neighboring base station from the at least one neighboring base station; configuring a set of auxiliary information for canceling the interference signals of a target terminal on the basis of the scheduling information of the at least one neighboring base station; and transmitting the set of auxiliary information for canceling (Continued)

(a)

(b)

the interference signals of the target terminal to the target terminal, wherein the auxiliary information comprises at least one of demodulation reference signal (DM-RS) related information and cell-specific reference signal (CRS) related information in association with interference signals from respective neighboring base stations.

11 Claims, 6 Drawing Sheets

Related U.S. Application Data filed on Apr. 10, 2013, provisional application No. 61/812,711, filed on Apr. 16, 2013, provisional application No. 61/837,133, filed on Jun. 19, 2013.

(51) Int. Cl.
| | |
|---|---|
| *H04L 5/00* | (2006.01) |
| *H04J 11/00* | (2006.01) |
| *H04B 17/345* | (2015.01) |
| *H04B 7/0456* | (2017.01) |
| *H04W 72/12* | (2009.01) |

(52) U.S. Cl.
CPC ............ *H04J 11/004* (2013.01); *H04L 5/005* (2013.01); *H04W 72/1263* (2013.01)

(56) References Cited

U.S. PATENT DOCUMENTS

| | | | | |
|---|---|---|---|---|
| 9,264,191 B2* | 2/2016 | Ellenbeck | ............. | H04W 48/16 |
| 10,110,358 B2* | 10/2018 | Yamada | ................ | H04W 72/08 |
| 2011/0269459 A1* | 11/2011 | Koo | ...................... | H04W 24/10 455/434 |
| 2012/0082195 A1* | 4/2012 | Wigren | .................. | H04B 1/712 375/220 |
| 2012/0099544 A1* | 4/2012 | Pajukoski | ............. | H04L 5/0032 370/329 |
| 2012/0113812 A1* | 5/2012 | Ji | ...................... | H04W 72/1263 370/241 |
| 2012/0113844 A1* | 5/2012 | Krishnamurthy | ..... | H04L 1/0026 370/252 |
| 2012/0122440 A1* | 5/2012 | Krishnamurthy | ..... | H04L 5/0053 455/418 |
| 2013/0286883 A1* | 10/2013 | Kim | ...................... | H04W 24/10 370/252 |
| 2014/0086371 A1* | 3/2014 | Li | .......................... | H04J 11/005 375/346 |
| 2014/0105224 A1* | 4/2014 | Frederiksen | .......... | H04L 1/1887 370/465 |
| 2014/0204866 A1* | 7/2014 | Siomina | ................ | H04L 5/0073 370/329 |
| 2014/0233407 A1* | 8/2014 | Pourahmadi | .......... | H04L 5/0007 370/252 |
| 2014/0233457 A1* | 8/2014 | Koutsimanis | .......... | H04J 11/005 370/328 |
| 2014/0233466 A1* | 8/2014 | Pourahmadi | .......... | H04L 5/0051 370/329 |
| 2014/0241293 A1* | 8/2014 | Luo | ........................ | H04L 5/0053 370/329 |
| 2015/0009948 A1* | 1/2015 | Raaf | ..................... | H04W 48/16 370/330 |
| 2017/0223715 A1* | 8/2017 | Yamada | .................. | H04W 8/24 |

FOREIGN PATENT DOCUMENTS

| | | |
|---|---|---|
| CN | 101932100 A | 12/2010 |
| CN | 102754356 A | 10/2012 |
| CN | 103262459 A | 8/2013 |
| JP | 2011151779 A | 8/2011 |
| JP | 2012169738 A | 9/2012 |
| JP | 6251292 B2 | 12/2017 |
| KR | 10-2010-0081913 A | 7/2010 |
| KR | 10-2010-0103107 A | 9/2010 |
| KR | 10-2007-0024310 A | 3/2012 |
| KR | 10-2012-0049156 A | 5/2012 |
| KR | 10-2012-0096553 A | 8/2012 |
| WO | 2010/079926 A2 | 7/2010 |
| WO | 2011052869 A1 | 5/2011 |
| WO | 2013/007491 A1 | 1/2013 |
| WO | 2013018639 A1 | 2/2013 |

OTHER PUBLICATIONS

CMCC: "Autonomous inter-cell interference cancellation", R1-122890, 3GPP TSG RAN WG1 Meeting #69, Prague, CZ, May 21-25, 2012.
Nokia Siemens Networks, Nokia Corporation: "Network assistance for CRS Interference Cancellation" 3GPP TSG-RAN WG2 Meeting #77bis, R2-121617, Mar. 26-30, 2012.
International Search Report from PCT/KR2013/007972, dated Jan. 16, 2014.
Written Opinion of the ISA from PCT/KR2013/007972, dated Jan. 16, 2014.

\* cited by examiner

METHOD FOR CANCELING INTERFERENCE IN WIRELESS COMMUNICATION SYSTEM AND APPARATUS THEREFOR This application is a National Stage Application of International Application No. PCT/KR2013/007972, filed on Sep. 4, 2013, which claims the benefit of U.S. Provisional Application Nos. 61/805,919 filed on Mar. 27, 2013, 61/810,685 filed Apr. 10, 2013, 61/812,711 filed Apr. 16, 2013, and 61/837,133 filed Jun. 19, 2013, all of which are hereby incorporated by reference in their entirety for all purposes as if fully set forth herein.

TECHNICAL FIELD

The present invention relates to a wireless communication system, and more particularly, to a method for supporting cancellation of interference in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for supporting efficient cancellation of interference in a wireless communication system.

Another object of the present invention devised to solve the problem lies in a method for utilizing specific information intended for a certain purpose as a condition for interference cancellation.

Objects of the present disclosure are not limited to the aforementioned objects, and other objects of the present disclosure which are not mentioned above will become apparent to those having ordinary skill in the art upon examination of the following description.

Technical Solution

The object of the present disclosure can be achieved by providing a method for supporting, by a serving base station, cancellation of an interfering signal in a received signal of a target terminal in a wireless communication system, the method including receiving, from at least one neighboring base station, scheduling information of the neighboring base station, configuring a set of assistance information for cancellation of an interfering signal of the target terminal based on the scheduling information of the at least one neighboring base station, and transmitting, to the target terminal, the set of assistance information for cancellation of the interfering signal of the target terminal, wherein the assistance information may include at least one of cell-specific reference signal (CRS)-related information and demodulation reference signal (DM-RS)-related information related to an interfering signal from each of the at least one neighboring base station.

Preferably, the CRS-related information may include at least one of a cell identity related to a CRS, the number of ports for transmission of the CRS, a CRS frequency shift, an MBSFN subframe pattern and a ratio of a transmit power of physical downlink shared channel (PDSCH) to a transmit power of the CRS.

Preferably, the DM-RS-related information may include at least one of a cell identity related to a DM-RS and a scrambling identity (nSCID) related to the DM-RS.

Preferably, the assistance information may include at least one of precoding matrix information used in transmitting the interfering signal, rank information, information about an index of physical downlink shared channel (PDSCH) starting symbol of the interfering signal and modulation order or MCS level information of the interfering signal.

Preferably, the assistance information may further include channel state information reference signal (CSI-RS)-related information or CRS-related information, the CSI-RS and CRS being capable of being quasi co-located (QCL) with the DM-RS.

Preferably, the assistance information may include physical downlink shared channel (PDSCH) resource element (RE) mapping information of the interfering signal, wherein the PDSCH RE mapping information may include at least one of the CRS-related information related to the interfering signal, a non-zero power CSI-RS index and a zero power CSI-RS index.

Preferably, the assistance information may include an almost blank subframe (ABS) pattern of the neighboring base station.

Preferably, when the assistance information includes the ABS pattern of the neighboring base station, the assistance information may be valid only for an ABS indicated by the ABS pattern.

Preferably, the assistance information may include a transmission mode of a terminal scheduled to receive the interfering signal.

Preferably, the method may further include transmitting, to the target terminal, information indicating one assistance information from among the set of the assistance information.

Preferably, a granularity of a resource allocation region may be\identically set between the serving base station and the neighboring base station to support cancellation of the interfering signal.

According to another aspect of the present disclosure, provided herein is a base station configured to support cancellation of an interference signal in a received signal of a target terminal in a wireless communication system, including a radio frequency (RF) unit, and a processor configured to control the RF unit, wherein the processor is configured to receive, from at least one neighboring base station, scheduling information of the neighboring base station, configure a set of assistance information for cancellation of the interfering signal of the target terminal based on the scheduling information of the at least one neighboring base station, and transmit, to the target terminal, the set of assistance information for cancellation of the interfering signal of the target terminal, wherein the assistance information may include at least one of cell-specific reference signal (CRS)-related information and demodulation reference signal (DM-RS)-related information related to an interfering signal from each of the at least one neighboring base station.

According to another aspect of the present disclosure, provided herein is a method for canceling, by a terminal, an interfering signal in a received signal in a wireless communication system, the method including receiving, from a serving base station, a set of assistance information for cancellation of an interfering signal from at least one neighboring base station, receiving information indicating at least one assistance information from among the set of the assistance information, and estimating the interfering signal based on the at least one indicated assistance information and canceling the interfering signal in the received signal, wherein the assistance information includes at least one of cell-specific reference signal (CRS)-related information and demodulation reference signal (DM-RS)-related information related to an interfering signal from each of the at least one neighboring base station, wherein the at least one indicated assistance information may be related to a neighboring base station likely to cause interference to the terminal among the at least one neighboring base station.

According to another aspect of the present disclosure, provided herein is a method for canceling, by a terminal, an interfering signal in a received signal in a wireless communication system, the method including receiving, from a serving base station, a set of assistance information for cancellation of an interfering signal from at least one neighboring base station, receiving information indicating a interference candidate subset of the set of assistance information, and detecting an interfering signal in the received signal in a blind manner using the indicated interference candidate subset, and canceling the detected interfering signal in the received signal, wherein the assistance information includes at least one of cell-specific reference signal (CRS)-related information and demodulation reference signal (DM-RS)-related information related to an interfering signal from each of the at least one neighboring base station, wherein the indicated interference candidate subset may be related to a neighboring base station likely to cause interference to the terminal among the at least one neighboring base station.

According to another aspect of the present disclosure, provided herein is a terminal configured to cancel an interfering signal in a received signal in a wireless communication system, the terminal including a radio frequency (RF) unit, and a processor configured to control the RF unit, wherein the processor is configured to receive, from a serving base station, a set of assistance information for cancellation of an interfering signal from at least one neighboring base station, receive information indicating at least one assistance information from the set of the assistance information, and estimate the interfering signal based on the at least one indicated assistance information and cancel the interfering signal in the received signal, wherein the assistance information may include at least one of cell-specific reference signal (CRS)-related information and demodulation reference signal (DM-RS)-related information related to an interfering signal from each of the at least one neighboring base station, wherein the at least one indicated assistance information may be related to a neighboring base station likely to cause interference to the terminal among the at least one neighboring base station.

According to another aspect of the present disclosure, provided herein is a terminal configured to cancel an interfering signal in a received signal in a wireless communication system, the terminal including a radio frequency (RF) unit, and a processor configured to control the RF unit, wherein the processor is configured to receive, from a serving base station, a set of assistance information for cancellation of an interfering signal from at least one neighboring base station, receive information indicating a interference candidate subset of the set of assistance information, and detect an interfering signal in the received signal in a blind manner using the indicated interference candidate subset, and cancel the detected interfering signal in the received signal, wherein the assistance information includes at least one of cell-specific reference signal (CRS)-related information and demodulation reference signal (DM-RS)-related information related to an interfering signal from each of the at least one neighboring base station, wherein the indicated interference candidate subset may be related to a neighboring base station likely to cause interference to the terminal among the at least one neighboring base station.

The technical solutions described above are simply a part of embodiments of the present invention. Various embodiments reflecting technical features of the present invention will be derived and understood from the following detailed description of the present invention by those having ordinary skill in the art.

Advantageous Effects

According to one embodiment of the present invention, interference cancellation may be efficiently performed in a wireless communication system.

According to one embodiment of the present invention, since specific information intended for a certain purpose is utilized as a condition for interference cancellation, applicability of resources may be enhanced.

Further, a coordinated multiple-point transmission and reception (CoMP) set may be efficiently determined in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
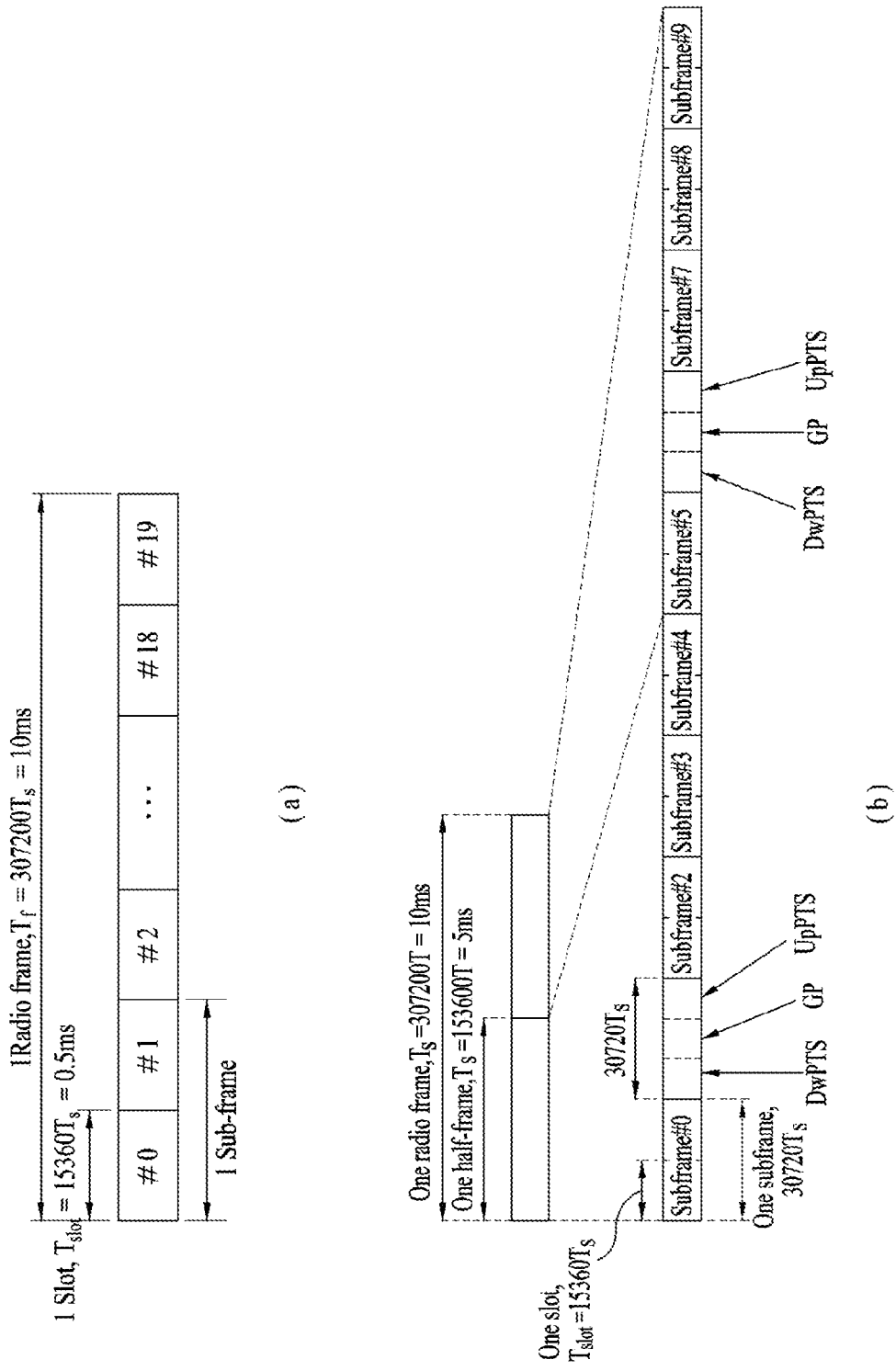
FIG. 1 illustrates an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link.

At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled by an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config- uration | Downlink- to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | 12800 · Ts | | |
| 8 | 24144 · Ts | | | — | — | — |

Figure 2:
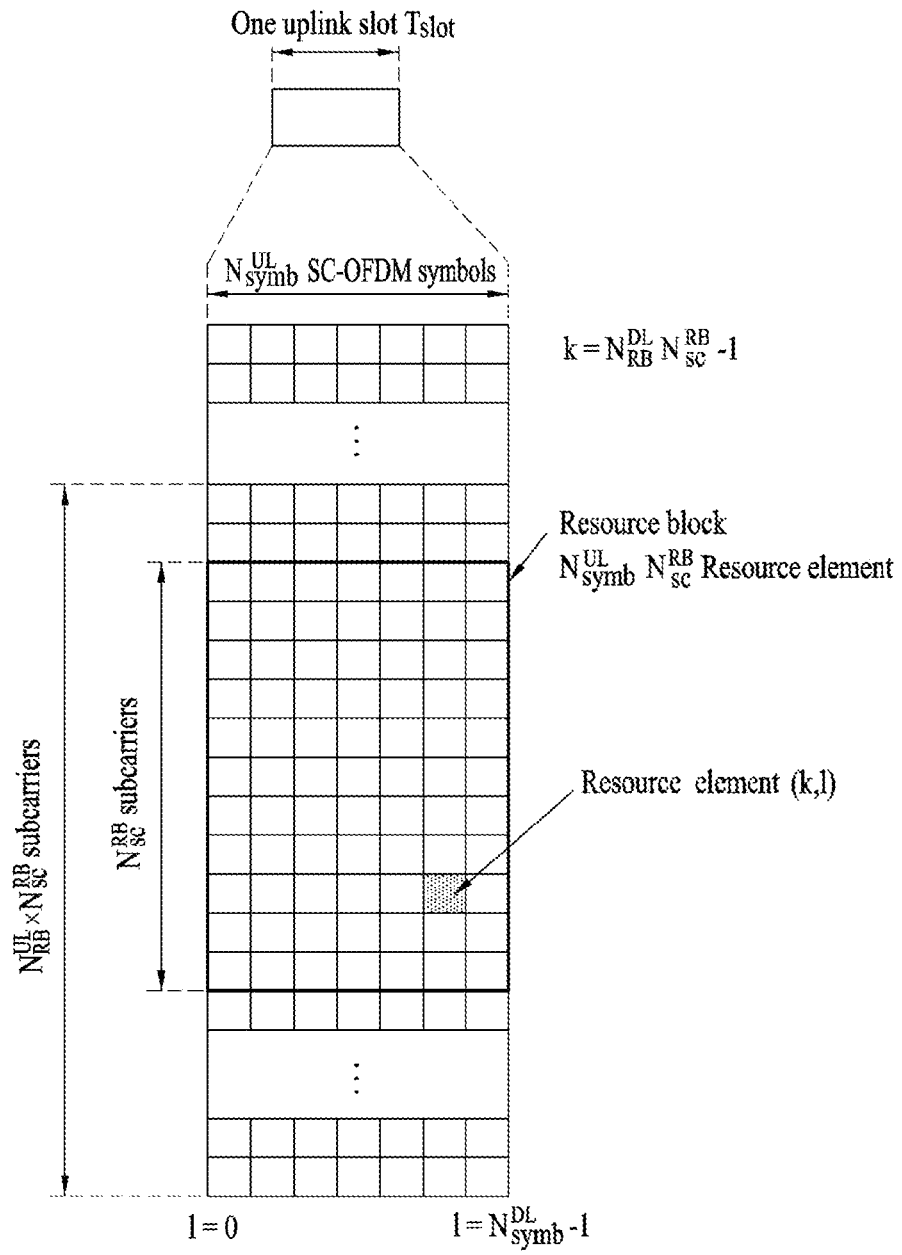
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$(e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
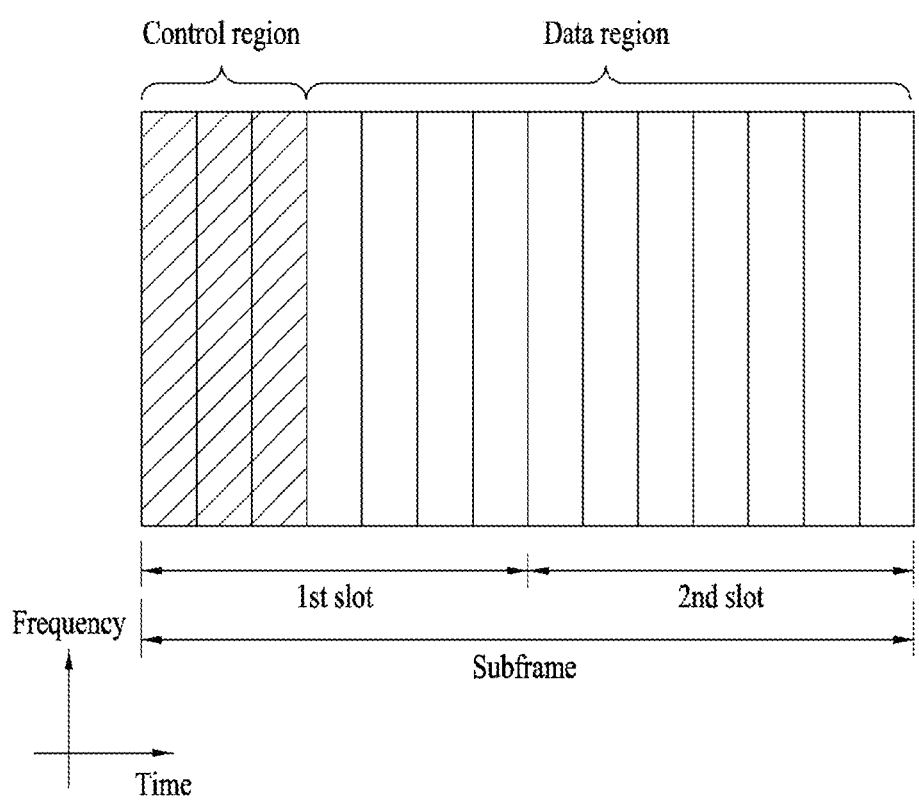
FIG. 3 is a diagram illustrating a down (DL) subframe structure used in the 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
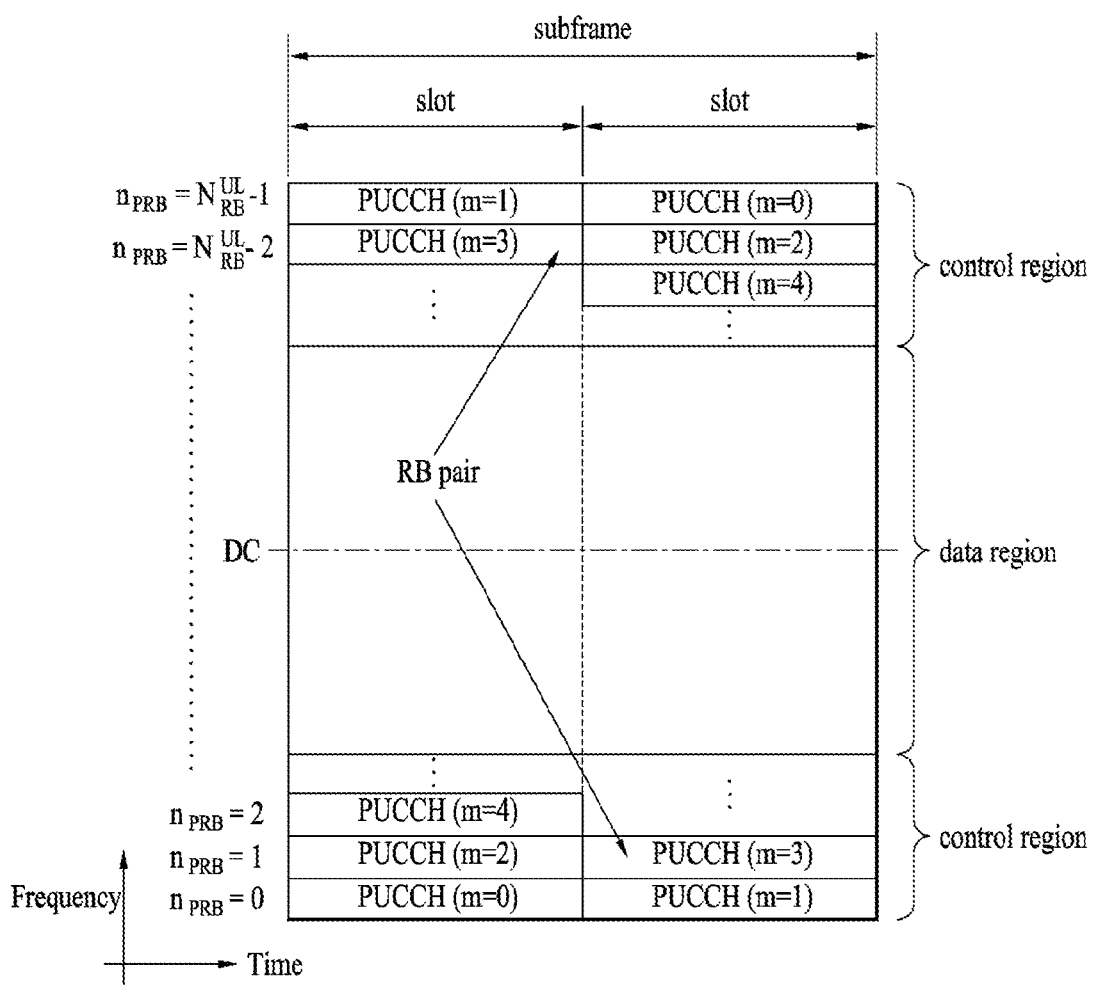
FIG. 4 is a diagram illustrating an uplink (UL) subframe structure used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CoMP (Coordinated Multiple Point) Transmission and Reception Operation

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Enhanced-PDCCH (EPDCCH)

In LTE after LTE Release 11, an enhanced-PDCCH (EPDCCH) which can be transmitted through the existing PDSCH region is considered as a solution to lack of capacity of a PDCCH caused by coordinated multi-point (CoMP), multi-user-multiple input multiple output (MU-MIMO), and the like and degradation of PDCCH performance caused by inter-cell interference. In addition, in the case of EPDCCH, channel estimation may be performed based on DMRSs in order to obtain a pre-coding gain, in contrast with the case of the existing CRS-based PDCCH.

EPDCCH transmission may be divided into localized EPDCCH transmission and distributed EPDCCH transmission according to configuration of a PRB pair used for EPDCCH transmission. Localized EPDCCH transmission represents a case in which resource sets used for transmission of an EPDCCH neighbor each other in the frequency domain, and precoding may be applied to obtain a beamforming gain. For example, localized EPDCCH transmission may be based on consecutive ECCEs, the number of which corresponds to an aggregation level. On the other hand, distributed EPDCCH transmission represents transmission of an EPDCCH in a separated PRB pair in the frequency domain, and has a gain in terms of frequency diversity. For example, distributed EPDCCH transmission may be based on the ECCE having four EREGs included in each PRB pair separated in the frequency domain.

A UE may perform blind decoding similar to the blind decoding performed in the legacy LTE/LTE-A system, in order to receive/acquire DCI through an EPDCCH. More specifically, the UE may attempt to decode (or monitor) a set of EPDCCH candidates according to each aggregation level to obtain DCI formats corresponding to a set transmission mode. Herein, the set of EPDCCH candidates to be monitored may be referred to as an EPDCCH USS. This search space may be configured/constructed according to each aggregation level. In addition, aggregation levels 1, 2, 4, 8, 16 and 32, which are more or less different from the aggregation levels for the legacy LTE/LTE-A system, are applicable according to the subframe type, the CP length, the quantity of resources available in a PRB pair, and the like.

For a UE for which EPDCCH is configured, REs included in a PRB pair set are indexed by EREGs, which are in turn indexed by ECCEs. EPDCCH candidates constituting a search space may be determined based on the indexed ECCEs and be subjected to blind decoding. Thereby, control information may be received. Herein, the EREG corresponds to the REG of legacy LTE/LTE-A, and the ECCE corresponds to the CCE. One PRB pair may include 16 EREGs.

For each serving cell, one UE may configure one or two EPDCCH PRB sets for monitoring PDCCH through higher layer signaling.

In 3GPP LTE Rel-11, a UE to which the CoMP technique is applied may estimate a channel for TPs potentially capable of participating in CoMP using channel state information reference signal (CSI-RS) resources defined as a CoMP measurement set, and feeds back CSI including a precoding matrix indicator (PMI), a channel quality indicator (CQI), and a rank indicator (RI) to a serving cell thereof based on the value of the estimated channel. Based on the fed back CSI information, the network may configure a dynamic point selection (DPS) technique of selecting a TP whose channel has a relatively good quality and causing the selected TP to transmit data to the UE, a coordinated scheduling/coordinated beamforming (CS/CB) technique by which TPs which actually participate in CoMP control scheduling and beamforming to attenuate mutual interference, and a joint transmission (JT) technique, by which TPs which actually participate in CoMP transmit the same data to the UE.

The present invention relates to information provided by a network (eNB) to improve signal reception performance of a UE equipped with a high performance receiver having an interference cancellation (IC) capability and cooperation between networks.

Generally, a cellular mobile communication system reaches the limit of system capacity in an urban environment as an interference-limited system. In addition, when the multiple transmit/receive antenna transmission technique, i.e., the SU-MIMO or MU-MIMO transmission technique, is applied to transmit a multilayer signal of multiple beams from one eNB, inter-layer interference in a cell also serves as an important factor determining the limit to the system capacity. Therefore, importance of coordinated transmission and high performance reception techniques has been magnified and corresponding efforts have been made to attenuate inter-cell interference and interference in a cell.

According to a DL CoMP technique, which causes a transmitter to configure a transmission beam based on reported CSI from receivers so as to minimize interference in a cell, complexity of the UE does not significantly increase during reception of data, but performance of this CoMP technique heavily depends on the accuracy of CSI reporting. On the other hand, according to the high performance reception technique, which is intended for a reception entity to obtain better reception performance using characteristics of an interfering signal, the way in which a UE acquires information about an interfering signal transmitted along with a signal scheduled therefor, i.e., a desired signal, is important. Typical examples of the high performance receiver include:

a linear MMSE IRC receiver;

a maximum likelihood detection receiver, and an interference cancellation receiver Better performance requires more information about the interfering signal. For example, an iterative decoding interference cancellation receiver, which is known to have the best performance, needs all information for decoding of an interfering signal since the UE needs to decode the interfering signal and regenerate an interfering signal to cancel interference.

In this disclosure, description will be given focusing on a technique of cancelling an interfering signal in a received signal after demodulating the received signal without decoding the signal. In particular, as a method for canceling a co-scheduled interfering signal, an interference cancellation method employing DM-RS of the interfering signal will be described on the assumption that the PDSCH has been transmitted based on the DM-RS.

A PDSCH co-scheduled on an RB scheduled for a specific UE is an interfering signal, an eNB needs to provide information about the interfering signal to the UE in order to cancel the interfering signal. In order to estimate the interference level using the DM-RS, the UE needs to know the sequence of the DM-RS of the interfering signal. To this end, the eNB needs to provide seed information of the DM-RS sequence of the interfering signal to the UE, and the UE estimates/cancels the interfering signal using the seed information of the DM-RS sequence.

Figure 5:
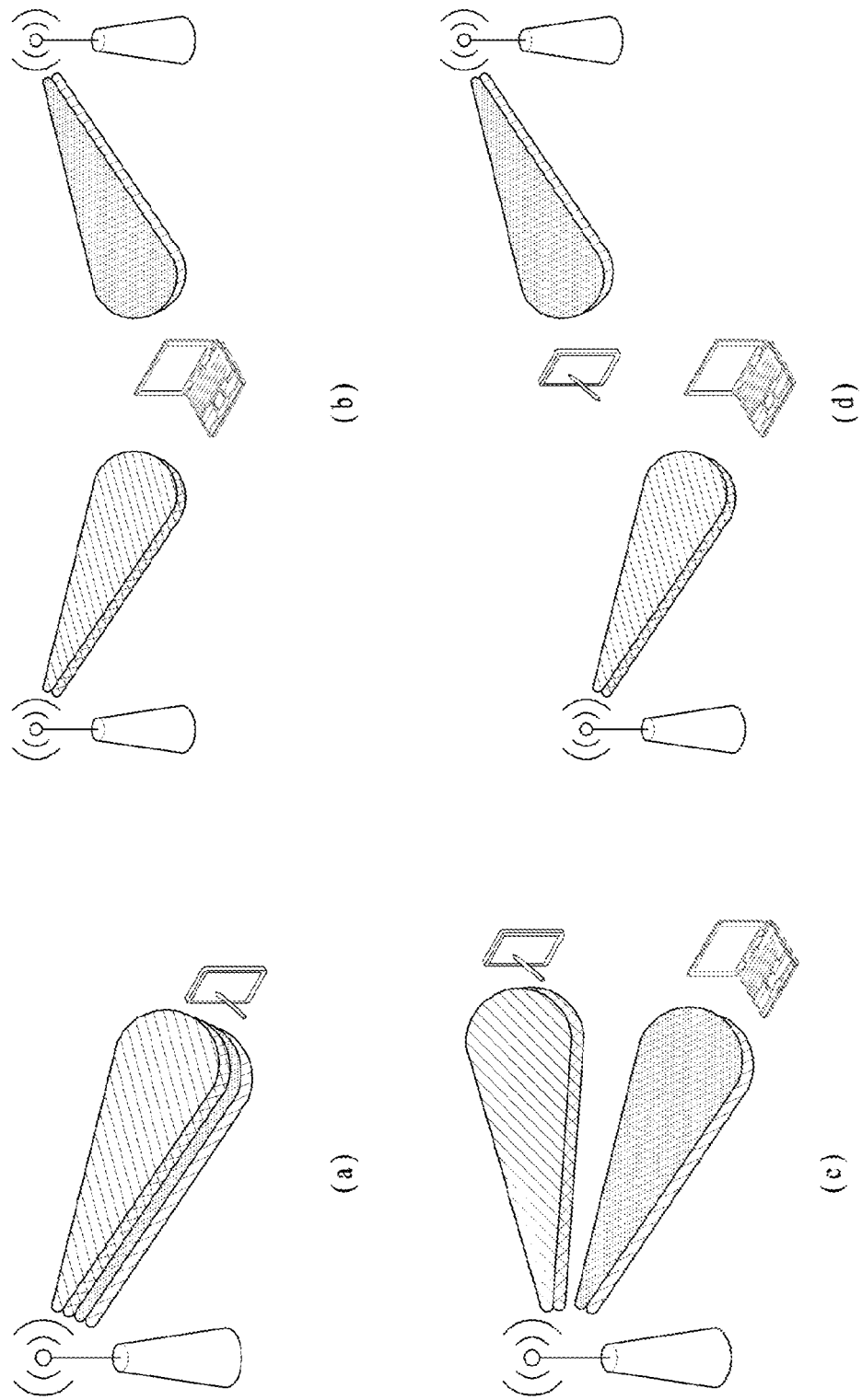
FIG. 5 is a multiple input multiple output (MIMO) system to which one or more embodiments of the present invention are applied.

A signal of another layer scheduled for a specific UE may serve as interference received by the specific UE. As shown in FIGS. 5(a) and 5(b), in single-cell SU-MIMO and multi-cell, interference from other layers co-scheduled on an SU-MIMO specific RB must be canceled. In this case, all information necessary for interference cancellation is contained in a DL control channel transmitted to the UE.

In contrast with FIGS. 5(a) and 5(b), FIGS. 5(c) and 5(d) illustrates a case where the UE fails to receive control information about an interfering signal when the UE receives control information about the PDSCH. FIGS. 5(c) and 5(d) show examples of single-cell MU-MIMO and multi-cell MU-MIMO. The present disclosure proposes a technique for improving interference cancellation performance of the receiver of a UE based on the examples of FIGS. 5(c) and 5(d).

Hereinafter, embodiments of the present invention will be described on the assumption that a signal received by the UE consists of a desired signal and an interfering signal. The desired signal is a DL signal scheduled for the UE, and the interfering signal corresponds to a DL signal scheduled for another UE different from the aforementioned UE.

In addition, in this specification, UEs scheduled to receive the interfering signal will be referred to as "interfering UEs".

Embodiment 1

In the case of single-cell MU-MIMO of FIG. 5(c), scheduling is performed by one eNB, and thus cooperation between eNBs is not needed. If both the desired signal (i.e., a signal scheduled for the UE) and the interfering signal are DM-RS-based signals, the seed value of the DM-RS sequence of the corresponding signal is selected from a signal set $\{n_{ID}^{DMRS,0}, n_{ID}^{DMRS,1}, N_{ID}^{cell}\}$ since both the desired signal and the interfering signal are transmitted from a single eNB. Accordingly, if the UE knows nSCID={0,1} used for the interfering signal, the UE may generate a DM-RS sequence, and estimate the value of a channel of the interfering signal using the generated DM-RS sequence. Additionally, the eNB needs to signal not only the rank of the desired signal but also a total rank of PDSCH scheduled by the eNB in a corresponding subframe in order to signal the DM-RS density used on a scheduled PDSCH transmission PRB. Additionally, the eNB may signal, to the UE, not only the rank (or the number of scheduled layers) used in the subframe for respective nSCIDs and information about the desired signal for the specific UE but also the modulation order of an interfering signal transmitted to the interfering UE. If the interfering signal is transmitted using two codewords and the same modulation order is applied to both codewords, signaling overhead may be reduced by signaling one modulation order value and information indicating that the modulation order is the same for both codewords.

In summary, in the embodiment of FIG. 5(c), the eNB may allow the UE to estimate interference using the RS of the interfering signal by providing the UE with the following information.

If the interfering signal is a DM-RS-based PDSCH,
    whether an nSCID used in generating a DM-RS sequence of the interfering signal or an nSCID unused for the desired signal is used for the interfering signal
    the number of layers (rank) per nSCID
    a scheduled total rank in a corresponding subframe
    modulation order per codeword (nSCID)
If the interfering signal is a CRS-based PDSCH,
    seed value (physical cell ID) information of the CRS sequence of the interfering signal, the number of CRS ports, CRS frequency shift, and MBSFN configuration information
    transmitted PMI (TPMI) information of the interfering signal
    PMI restriction information: this information may allow an interference eNB to use only a specific TPMI set to estimate interference. In the case of single-cell operation, this information may deliver codebook restriction information. In the case of multi-cell operation, such information should be transmitted between eNBs and delivered to a UE. Alternatively, information indicating that a specific TPMI is not used may be delivered such that the UE finds the PMI of the interfering UE in a restricted set in the information in a blind manner.

The pieces of information about such interfering signal may be contained in downlink control information (DCI) about the desired signal and dynamically transmitted. In transmitting the control information to the UE, the eNB transmits not only control information about the desired signal but also control information about the interfering signal. For example, as shown in the table below, the eNB provides additional information for interference cancellation to the UE through the DCI, and the UE uses the additional information to estimate the interference level and to cancel interference in all received signals.

TABLE 5

| Legacy DCI | Additional DCI (control information for IC) |
| --- | --- |
| Control information of the UE (RB assignment, TPC, HARQ, {MCS, NDI, RV} for CW1, {MCS, NDI, RV} for CW2) | Information of interfering UE(s)/layer(s) (nSCID, the number of layers (rank) per nSCID, modulation order per codeword, total rank) |

Embodiment 2

Hereinafter, description will be given of an embodiment of network signaling for assisting in interference cancellation of the UE in the case where the network schedules multi-cell MU-MIMO as shown in FIG. 5(d). In the scenario shown in FIG. 5(d), a plurality of UEs is scheduled on the same PRB, a target UE receives, from the serving cell thereof, assistance information (or control information) for canceling an interfering signal to enhance performance of reception of a desired signal.

To provide the target UE with the assistance information for canceling the interfering signal in the scenario shown in FIG. 5(d), scheduling information about a neighboring cell needs to be signaled, and therefore network coordination between eNBs is needed. The degree of cooperation between eNBs and the type of information which may be signaled to the UE may vary with speed and latency of a backhaul link between the eNBs.

Backhaul links may be broadly divided into three types.

Ideal backhaul (non-X2) link: As taken into consideration in legacy LTE Rel. 11 CoMP, eNBs cooperating with each other form a kind of CoMP cluster, and cells in the same CoMP cluster are connected by a backhaul link such as an optical fiber having high capacity and low latency to ensure cooperative scheduling and cooperative data transmission and reception, thereby enabling cooperative scheduling and maintaining accurate time synchronization to ensure cooperative data transmission. In addition, it may be assumed that, when signals transmitted from cells in a CoMP cluster participating in cooperative transmission are received, the difference in reception time between signals transmitted from the cells according to propagation delay from the cells comes within the length of the cyclic prefix (CP) of an OFDM symbol. In this case, most necessary information including dynamic information which is changeable in every subframe to assist in interference cancellation of the UE may be more accurately provided to the UE than through dynamic signaling.

Slow backhaul link: A typical backhaul link having latency ranging from a few milliseconds to tens of milliseconds. Transmission of dynamic information for cooperation between eNBs is not allowed through this link. Only cooperation between eNBs for delivering semi-static information to a neighboring eNB is allowed on this link.

Fast backhaul link: A backhaul that falls between the ideal backhaul link and the slow backhaul link. This link may allow prompt cooperation between eNBs (with a latency within 1 ms). As information assisting the UE, limited information other than information about a semi-static neighboring eNB may assist in interference cancellation of the UE through dynamic signaling.

In the case of multi-cell MU-MIMO as shown in FIG. 5(d), the target UE may be provided with the following information by the network to cancel the interfering signal. Similar to the case of FIG. 5(c), the interfering signal may not be decoded, but only modulation of the signal may be performed to cancel and/or attenuate interference. This case is described below.

2-1. DM-RS-Based Signal Acting as Interfering Signal

What is basically needed in estimating the degree of interference using DM-RS and canceling the interference is the seed value of a DM-RS sequence. If interference is applied not by the serving cell but by a neighboring cell, nSCID information and values of cell IDs (virtual cell ID and physical cell ID) used to generate a DM-RS sequence which the neighboring cell uses for UE scheduling are also needed. In addition, a part of channel estimates of CSI-RS and CRS whose densities are higher than the density of DM-RS may be used to enhance DM-RS estimation performance, and in this case, relevant information is also needed. In this regard, quasi co-Location (QCL) assumption is defined and signaled to the UE in LTE Rel. 11. In other words, the eNB may also provide the target UE with information on a CSI-RS and CRS with which the interfering DM-RS sequence is allowed to establish QCL assumption. To identify the DM-RS density in a subframe, all rank information on a PRB scheduled for the target UE in the subframe is also needed. The effect of such information may be obtained by signaling rank information per pair (VCID, nSCID) to the UE. Additionally, a modulation order per codeword of the interfering signal may also be signaled to the target UE.

Hereinafter, description will be given of a method for signaling the information described above. The signaling technique may change depending on the speed and latency of a backhaul link. In this disclosure, techniques including the most conservative signaling technique based on the slow backhaul link and a signaling technique based on the ideal backhaul link are proposed.

Even if it is difficult to exchange dynamic information between eNBs with respect to UE scheduling information, which is changed in every subframe, assistance information for canceling the interfering signal may be semi-statically provided to the UE. Specifically, the eNB may select a candidate group of cells which may cause interference to the target UE, receive DM-RS sequence-related information and QCL information used by the cells from the cells, configure a set of assistance information for cancellation of the interfering signal, and provide the set to the target UE through higher layer signaling. In addition, the eNB may explicitly indicate one of the sets of assistance information for the target UE through PDCCH (using "Bit value" in Table 6). The target UE may estimate and cancel the interfering signal based on the selected set of assistance information.

In the case where eNBs possibly exchange dynamic information with respect to UE scheduling information which changes in every subframe, the eNB may identify characteristics of an interfering signal to be transmitted in the current subframe by exchanging information with a neighboring cell, select some of the provided sets of assistance information and inform the target UE of the same through physical layer signaling. Then, the target UE may search the DM-RS sequence of the interfering signal in the selected sets and estimate interference.

In these two cases, the target UE uses the sets of assistance information provided by the eNB to detect whether the interfering signal from a candidate set (i.e., the interference PDSCH signal) is present in the subframe. That is, assistance information indicated by PDCCH may be utilized in the former case, and some sets (subsets) of the sets of assistance information may be utilized in the latter case. The target UE utilizes the provided assistance information (e.g., CRS or DM-RS sequence information and QCL information) to determine whether a reference signal is detected with reception energy exceeding a certain level. The target UE estimates an interference channel based on the reference signal detected with reception energy exceeding a certain level, and also detects transmitted interference PDSCH and eliminates the detected reference signal and interference PDSCH signal from the received signal.

Table 6 below shows examples of information delivered through semi-static signaling.

TABLE 6

| Bit value | DM-RS information | | | QCL assumption | | Rate Matching information | | | PDSCH starting Symbol index | Modulation order restriction |
|---|---|---|---|---|---|---|---|---|---|---|
| | VCID (virtual cell ID) $\in \{0, 1, 2, \ldots, 503\}$ | nSCID $\in \{0, 1\}$ | Rank Restriction | (non-zero power) CSI-RS index | PCID (Physical Cell ID) | CRS information (CRSPortsNumber, FrequencyShift, MBSFNsubframe pattern) | (NZP) CSI-RS index | ZP CSI-RS index | | |
| 0 | nVCID(0) | (0, 1) | — | CSI-RS index(0) | nPCID(0) | PortNum0, Freqshift0, MBSFN_subframe_0 | | | 2 | — |
| 1 | nVCID(1) | {0} | 1 | CSI-RS index(1) | | PortNum1, Freqshift1, MBSFN_subframe_1 | | | 1 | 2 |
| 2 | nVCID(2) | {0} | 2 | | nPCID(2) | PortNum2, Freqshift2, MBSFN_subframe_2 . . . | | | 3 | 4 |

Seed Value Set of DM-RS Sequence

The eNB determines a set of candidates which may cause dominant interference to the target UE, and transmits the same to the target UE as shown in Table 6. First, VCID having a value in the range from 0 and 503, in which the seed value of the DM-RS sequence falls, and nSCID set to 0 or 1 are provided to the target UE. The VCID and nSCID are referred to as "DM-RS-related information". nSCID may be set to, for example, 0 or 1. If both 0 and 1 are used as the values of nSCID with respect to the VCID, these two values may be signaled to the UE. Alternatively, the value of nSCID may not be signaled for the VCID. Specifically, if the values of nSCID 0 and 1 corresponding to nVCID(0) in Table 6 above are both signaled, the UE may use nVCID(0) and nSCID=0 to generate a DM-RS sequence to estimate interference, and may use nVCID(0) and nSCID=1 to generate a DM-RS sequence to estimate interference.

If the value of nVCID(0) is signaled and the value of the nSCID field is omitted, the UE generates DM-RS sequences for all nSCID values (e.g., 0 and 1) with respect to nVCID(0) to estimate interference. However, if nSCID corresponding to a specific VCID is limited to one value as in the case of bit value=1 in Table 6, the UE perform interference estimation for only a DM-RS sequence generated with a designated nSCID, assuming that the DM-RS sequence of the interfering signal using the VCID is generated using only the designated nSCID. For example, since only nSCID={0} is signaled for nVCID(1), interference estimation is performed using a DM-RS sequence in consideration of only the case of nSCID=0 for nVCID(1).

Rank Restriction

Rank restriction information may indicate whether or not the rank of an interfering signal using the DM-RS is restricted. If information of the corresponding field is omitted, the UE may detect the rank information of the interfering signal corresponding to a DM-RS seed value in a blind manner, and utilize the same for interference cancellation. On the other hand, if a specific rank value is signaled to the rank restriction field, this indicates, for the UE, that the maximum rank is restricted to the specific rank value. Accordingly, the UE assumes that a rank higher than the signaled value has not been used for a DM-RS sequence corresponding to the seed value (a DM-RS sequence of the signaled VCID value and nSCID), and does not perform search for an interfering DM-RS sequence for the ranks higher than the signaled value. For example, in Table 6 above, if bit value=0, nSCID=0 and nSCID=1 are used for nVCID(0), which signals to the UE that an interfering DM-RS sequence is likely to be used. If both nSCID values of {0, 1} are signaled without rank restriction, interference cancellation (IC) may be performed by searching a DM-RS sequence in the range from rank=1 to rank=8 in a blind manner for the case of nVCID(0) and nSCID=0 and searching a DM-RS sequence in the range from rank=1 to rank=2 for the case of nSCID=1. If there is no rank restriction on the value of each nSCID, the maximum rank value supportable by each value should be pre-agreed between the eNB and the UE. If the value of the rank restriction field is not signaled, the UE searches a DM-RS sequence for each nSCID value in the range up to the pre-agreed maximum rank in a blind manner. In 3GPP Rel. 11, if nSCID=0, the maximum rank is restricted to 8. If nSCID=1, the maximum rank is restricted to 2.

When bit value=1 in Table 6 above, nSCID is restricted to nSCID=0 for nVCID(1), and the rank restriction field is set to 1. This announces, to the UE, that the interfering DM-RS sequence according to nVCID(1) and nSCID=0 is transmitted with the rank restricted to 1. Thereby, the UE does not consider interference with ranks higher than or equal to 2 for the DM-RS sequence and performs IC considering only the case of rank=1. In providing such rank restriction information to the UE, rank coordination between eNBs is essential. That is, information indicating that scheduling for a specific DM-RS sequence will not be performed for ranks higher than or equal to a certain rank for a certain time, i.e., information indicating that scheduling will be performed in the range below a specific rank should be exchanged between eNBs.

Modulation Order or MCS Restriction

The field of modulation order restriction information is intended to signal whether or not there is a restriction to the modulation order of an interfering signal using a corresponding DM-RS sequence. If the information of the field is omitted, the UE finds the modulation order of an interfering signal corresponding to the seed value of the DM-RS sequence in a blind manner, and utilizes the same in performing interference cancellation. However, if a value of a specific modulation order is signaled to the modulation order restriction field, this indicates, for the UE, that the maximum modulation order is restricted to the value of the specific modulation order, and the UE demodulates DM-RS of the interfering signal in a blind manner assuming a modulation order less than or equal to the specific modulation order. Herein, modulation order={2, 4, 6} indicates QPSK, 16QAM, and 64QAM. Of course, a higher modulation order value may be signaled. For example, if 4 is signaled to the modulation order restriction field, this indicates, for the UE, that the DM-RS has been modulated using QPSK or 16QAM. Thereby, the UE may demodulate the DM-RS and find a corresponding coordinate in the constellation assuming that the DM-RS has been modulated into QPSK, and also demodulate the DM-RS and find a corresponding coordinate in the constellation assuming that the DM-RS has been modulated using 16QAM. The UE may determine a modulation order applied to modulation between the two values, and use the determined modulation order to estimate the channel of the interfering signal and cancel interference.

In another embodiment, the maximum modulation order need not be designated. Instead, one of 2, 4 and 6 may be designated as the modulation order. Thereby, a specific modulation order may be indicated. In this case, the UE may perform demodulation only for the specific modulation order, thereby enhancing efficiency of interference cancellation. The UE may additionally perform blind decoding for the indicated modulation order.

Similarly, modulation and coding scheme (MCS) restriction information rather than modulation order restriction may be signaled to the UE. In other words, not simply a modulation order but also a code rate may be signaled to the UE. That is, the UE is informed that the MCS is restricted to a range below a specific value. Thereby, the UE recognizes that an interfering signal corresponding to the seed value of the DM-RS sequence has been modulated and coded in a level lower than or equal to a specific MCS level, performs bind search of the modulation and code rate of the interfering DM-RS sequence, and uses the DM-RS to estimate a channel for the interfering signal to cancel interference. The MCS table for PDSCH defined in LTE Rel. 11 is configured by a combination of a modulation order and a transport block size (TBS) index.

TABLE 7

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |

TABLE 7-continued

| MCS Index $I_{MCS}$ | Modulation Order $Q_m$ | TBS Index $I_{TBS}$ |
|---|---|---|
| 28 | 6 | 26 |
| 29 | 2 | Reserved |
| 30 | 4 | |
| 31 | 6 | |

That is, an MCS index indicates a modulation order and a TBS index. Herein, the modulation order has aforementioned values of {2, 4, 6}, which indicate QPSK, 16QAM, and 64QAM, respectively. The TBS index is an indirect code rate indicator. An actual code rate may be determined according to PDSCH RB assignment and the number of layers. Accordingly, when MCS restriction information is provided, the modulation order may be specifically restricted by, for example, signaling that the MCS index is restricted to values less than a specific value like $I_{MCS}<10$ providing MCS restriction information such as $10 \leq I_{MCS} \leq 16$. Thereby, blind decoding may be performed within the indicated modulation order. Such MCS restriction information may be useful for the IC receiver of the UE such as receivers for demodulation-based IC and coding-based IC.

In providing such modulation order or MCS restriction information to the UE, coordination between eNBs for modulation order or MCS is essential. That is, information indicating that scheduling for a specific DM-RS sequence will not be performed for a modulation order or MCS level higher than or equal to a certain modulation order or MCS level for a certain time, i.e., information indicating that scheduling will be performed in the range below a specific modulation order or MCS level or that scheduling will be performed in a specific modulation order or MCS level should be exchanged between eNBs. Details of restriction on the modulation order or MCS level may also be applied to the CRS-based PDSCH interfering signal. If modulation order and MCS level restriction information are signaled for PDSCH modulated into a specific CRS, the UE may perform technical operations, assuming that the modulation order or MCS level of the corresponding interfering signal is restricted to below a signaled value.

DM-RS Sequence with Restrictions

Rank restriction is applied or the modulation order (or MCS level) is restricted for interference cancellation of the UE to ensure that the target UE correctly demodulates and/or decodes the interfering signal. Generally, the reception SNR of the interfering signal may be lower than that of the desired signal, and accordingly providing only information about the interfering signal does not ensure that the UE detects and cancels the interfering signal. To ensure that the target UE demodulates and/or decodes the interfering signal, not only the rank but also the modulation order or MCS level needs to be lowered such that IC is properly performed and thus the reception performance of the desired signal is enhanced. This means that the maximum rank or a higher modulation order or MCS level is very likely to be unavailable when scheduling of a signal of the UE is performed in a structure allowing the UE to perform IC through network cooperation. Accordingly, the eNB may separately manage DM-RS sequences and resources to enhance system throughput and UE throughput. That is, a DM-RS sequence having no restriction on the rank or modulation scheme may be used to schedule PDSCH for UEs positioned at the center of a cell and thus provided with a very good geometry, while a DM-RS sequence having a restriction on the rank or modulation scheme may be used to schedule PDSCH for UEs positioned near a cell boundary, thus applying interference to a neighboring cell.

QCL Assumption

To enhance performance of interference channel estimation through a DM-RS sequence, the eNB also provides QCL assumption. Quasi co-location (QCL) assumption is intended to enhance channel estimation performance of a DM-RS sequence by employing a channel characteristic value of an RS having a density higher than that of the DM-RS and the same or similar channel characteristics as a specific DM-RS sequence in estimating an interference channel of the specific DM-RS sequence. Specifically, QCL for each antenna port is defined in 3GPP LTE Rel. 11. For QCL, two different behaviors, namely, Behavior A and Behavior B are defined. Behavior A is defined as a behavior by which a CRS, a DM-RS and a CSI-RS are transmitted from a serving cell, and all antenna ports have the same channel characteristics. Behavior B is defined as a behavior by which the DM-RS has the same channel characteristics as a specific CSI-RS in demodulating PDSCH. In Behavior B, not only QCL between the DM-RS and the CSI-RS but also QCL with a specific CRS for frequency characteristics may be signaled to the UE.

Accordingly, QCL assumption may be delivered for each sequence in a DM-RS sequence candidate group. For example, a DM-RS sequence may be mapped to a specific (non-zero power) CSI-RS index and the mapping may be signaled. A proposed method according to one embodiment of the present invention is not limited to the CoMP structure defined in 3GPP LTE Rel. 11, and therefore the CSI-RS index is not limited to a CSI-RS set for CSI feedback of the UE in the CoMP scheme. Since the UE does not need to feed back CSI for a signaled CSI-RS index, CSI-RSs that the UE needs to measure may unnecessarily increase to retrieve channel characteristics of the CSI-RSs as information assisting in estimating a specific DM-RS sequence. Accordingly, not only CSI-RS but also information from CRS of a specific cell is preferably referenced for QCL information intended for interference channel estimation for a specific DM-RS sequence. That is, by signaling a CSI-RS index or a PCID of a specific cell for QCL assumption, channel characteristics from the CRS of the cell may be retrieved.

In CoMP scenario 4, however, TPs at different positions share the same PCID, and therefore signaling only PCID for QCL assumption is inappropriate. Accordingly, a CSI-RS index is signaled to the UE in this case. In summary, a CSI-RS index or PCID may be signaled for QCL assumption, and the UE uses only the signaled CSI-RS index or PCID for QCL assumption information to reference channel characteristics from the CSI-RS or uses a CRS corresponding to the PCID to reference channel characteristics. If both a CSI-RS index and a PCID are signaled for QCL information about a specific DM-RS sequence, this indicates that a specific DM-RS sequence has a QCL relationship with CRSs corresponding to the signaled CSI-RS index and the signaled PCID. In other words, it can be seen that the DM-RS has a QCL relationship with the signaled CSI-RS index, and in some cases, the DM-RS may have a QCL relationship with a CRS corresponding to the signaled PCID. Accordingly, the UE estimates interference for each case to search an interfering signal and perform interference cancellation.

When a CSI-RS index for QCL assumption is signaled to a UE as shown in Table 6, the eNB needs to separately signal, to the UE, a CSI-RS configuration for long-term measurement and QCL assumption in addition to a CSI-RS configuration for CSI measurement. Such CSI-RS configuration may include CSI-RSs for CSI measurement.

Rate Matching Information

CRS information of a neighboring cell also needs to be transmitted in order to signal PDSCH RE mapping of an interfering signal and presence or absence of CRS interference on a specific RE. The CRS information includes the number of CRS antenna ports, CRS frequency shift={0, 1, 2, . . . , 5}, and an MBSFN subframe pattern. When presence of CRS interference is signaled to the UE such that the CRS interference is canceled, a physical cell ID of the CRS is signaled in place of CRS frequency shift. That is, by signaling the physical cell ID, the number of CRS antenna ports, and the MBSFN subframe pattern as the CRS information, the UE is allowed to cancel CRS interference on the corresponding CRS location if the UE is capable of controlling CRS interference.

In addition, in order to signal presence or absence of interference from an interfering signal on a specific RE, CSI-RS information and ZP CSI-RS information of a neighboring cell may also be signaled to the UE. That is, the UE is not allowed to perform IC on the REs to prevent degradation of performance since PDSCH of the interfering signal has not been mapped.

In addition, a CSI-RS index may be separately signaled to announce a PDSCH rate matching pattern of the interfering signal. Alternatively, a CSI-RS index signaled for QCL assumption may be used. For example, PDSCH of an interfering signal using a DM-RS sequence generated with nVCID(0) and nSCID={0,1} signaled when bit value=0 in Table 6 has a QCL relationship with CSI-RS index 0, the UE may obtain channel characteristics from CSI-RS index 0, and recognize that the PDSCH of the interfering signal is transmitted by being rate-matched to a configuration corresponding to CSI-RS index 0. In this case, separate CSI-RS index signaling for rate matching information is not needed. If a CSI-RS index for QCL and a separate CSI-RS index for rate matching information are signaled, rate matching for the interfering signal assumed by the UE complies with a CSI-RS index separately transmitted for rate matching information. In Table 6, a plurality of CSI-RS indexes for providing rate matching information may be signaled. The UE may use a CSI-RS index received as rate matching information or a CSI-RS index having a QCL relationship according to capability of the UE to perform interference cancellation for a CSI-RS on an RE on which the CSI-RS is transmitted.

Additionally, a ZP CSI-RS index used to transmit an interfering signal may also be transmitted to the UE. The signaled ZP CSI-RS may be muted or mapped to PDSCH depending on a UE for which the interference eNB schedules the PDSCH. The information that such signaling is intended to deliver to the target UE is that the PDSCH is likely to be mapped to the ZP CSI-RS or the ZP CSI-RS is likely to be muted. That is, the UE is allowed to not perform IC on the corresponding REs using the ZP CSI-RS or to determine whether to perform IC on the REs within the ZP CSI-RS through detection of energy. Information indicating that PDSCH is transmitted in the region other than that of the signaled ZP CSI-RS if there is no separate signaling or restriction except for the signaled CRS index and CSI-RS index (e.g., PSS/SSS/PBCH transmission, positioning RS transmission, MBSFN subframe, etc.) is delivered to the UE. Upon receiving this information, the UE assumes that the PDSCH is transmitted in the region other than that of the ZP CSI-RS.

Generally, the ZP CSI-RS is configured to cover a configured CSI-RS position. Accordingly, signaling indicating that the ZP CSI-RS covers a CSI-RS transmission position may be delivered to the UE without transmitting CSI-RS information as rate matching information of a separate interfering signal. That is, information indicating that PDSCH may or may not be transmitted is provided through the signaled ZP CSI-RS.

If there is no separate signaling for the ZP CSI-RS of the interfering signal, the UE may never perform IC on corresponding REs, assuming that the PDSCH of the interfering signal may not be mapped to a whole union of one or more ZP CSI-RSs preconfigured for the UE. Specific IC operation on the REs depends on embodiments of the UE.

PDSCH Start Symbol Index

When interference applied by other eNBs is canceled, PDSCH start symbols of the interfering signal and the desired signal should be pre-aligned between eNBs. It is not preferable to cancel interference caused by a CRS-based PDCCH of a neighboring cell using a DM-RS-based PDSCH. The OFDM symbol on which PDSCH starts varies depending on the amount of control information transmitted through the PDCCH and load applied to the eNB in each subframe, and therefore dynamically signaling a PDSCH start symbol of a neighboring cell is very risky. Accordingly, the eNB may signal a PDSCH start symbol index for each DM-RS sequence to the UE through semi-static signaling as shown in Table 6. Herein, the PDSCH start symbol index implies that the interfering signal using the DM-RS sequence has no PDCCH of the interfering signal after the signaled PDSCH start symbol. For example, in Table 6, a PDSCH start symbol index=2 is signaled for bit value=0, which means that PDCCH of an interfering signal transmitted by an eNB using a DM-RS sequence corresponding to nVCID(0) is not transmitted after the signaled PDSCH start symbol index=2. In other words, PDCCH (or PDSCH) may be transmitted for OFDM symbol index=0, 1, and it is ensured for the UE that PDCCH is not transmitted for OFDM symbol index≥2. If a desired signal starts with OFDM symbol index=1, and a signal using a DM-RS sequence having nVCID(0) as the seed value thereof is received along with strong interference, the UE may perform demodulation for OFDM symbol index=1 without performing IC, and may perform IC and then demodulation for subsequent OFDM symbol indexes. In other words, when the UE receives PDSCH start symbol index information, the UE performs IC only in a region in which transmission of PDSCH is ensured, and performs demodulation without IC in the other region. In this case, a lower weight may be assigned to the region in which demodulation is performed without IC in order to reduce loss.

According to another embodiment, the UE may assume, without separate signaling for a PDSCH start symbol index as shown in Table 6, that PDSCH of a neighboring cell invariably starts after a symbol mapped to a PDSCH targeting the UE. To this end, information about the PDSCH start symbol index needs to be pre-exchanged between eNBs. Regarding this information, information indicating that PDCCH will not be transmitted after a specific OFDM symbol index and subframe information, e.g., a subframe pattern taking the aforementioned information as valid, need to be exchanged.

According to another embodiment, each eNB may make the most conservative assumption for the PDSCH start symbol index. The UE performs IC for PDSCH on a symbol after the maximum number of OFDM symbols usable for PDCCH transmission by the serving cell of the UE, assuming that the maximum number of OFDM symbols is also used by neighboring cells. In this case, the UE assumes that the bandwidth and frame structure type of the serving cells of the UE are the same as those of neighboring cells interfering with the serving cell.

Similarly, coordination of the position at which PDSCH and EPDCCH are transmitted may also be pre-exchanged between the eNBs. The EPDCCH may also be demodulated using a DM-RS in a similar manner to the case of the PDSCH. Since the EPDCCH can be multiplexed with control information of up to four UEs within one RB, it is difficult to cancel interference in units of PRBs or bundled PRBs. Accordingly, in cancelling an interfering signal to improve performance of reception of a desired signal, the UE performs IC assuming that PDSCH of another UE or layer is transmitted as the interfering signal as long as there is no separate information. To this end, a region in which PDSCH is transmitted between eNBs and a region in which EPDCCH is transmitted need to be pre-designated and information thereon needs to be pre-exchanged. That is, information indicating that EPDCCH of an eNB is transmitted in a specific frequency domain or specific time-frequency domain is exchanged.

2-1-1. Signaling Optimization

In the case of a fast backhaul link mentioned above, the eNB may dynamically transmit, to the UE, information assisting in performing interference cancellation in every subframe, in addition to semi-static signaling. For example, when the UE receives information about candidate seed values 1 to 8 of interfering DM-RS sequences, the number of candidates may be reduced by providing, through dynamic signaling, information indicating that only candidate seed values 2 to 4 have been used. In some cases, the eNB may signal a correct DM-RS sequence of an interfering signal by transmitting only the seed value of one DM-RS sequence. Alternatively, rank (the number of layers of an interfering signal) information may be indicated through dynamic signaling. In this case, the rank information may vary depending on the number of layers on which the UE is allowed to perform interference cancellation.

2-1-2. DM-RS Sequence Search Procedure—Use of Received Signal Powers of QCLed RSs According to anther embodiment, rather than detecting a DM-RS sequence of the interfering signal in a blind manner, a UE receiving signaling of information about an interfering signal as shown in Table 6 may use a CRS according to a CSI-RS index or physical cell ID signaled as possibly having QCL assumption in finding the DM-RS sequence of the interfering signal. That is, using CSI-RS or CRS for QCL assumption means that the UE periodically or aperiodically measures the CSI-RS or CRS. In this case, only when the strength of the received CSI-RS or CRS is higher than or equal to a certain level, may it be determined that a DM-RS associated with the CSI-RS and CRS is likely to operate as interference. Accordingly, a DM-RS acting as interference may be detected first to measure an interference channel and then perform IC.

2-1-3. PRB Bundling Alignment

In receiving information assisting in interference cancellation to cancel an interfering signal in the received signal, PRB assignment of the interfering signal needs to be additionally considered. In other words, a frequency domain occupied by the desired signal and a frequency domain occupied by the interfering signal need to be taken into consideration. This is an issue about whether or not interference estimated for all PRBs assigned to the desired signal can be canceled when a DM-RS sequence for the interfering signal is detected and interference is estimated using the detected sequence.

For example, when the UE detects DM-RS sequence A as an interfering signal with respect to a specific interfering signal A and attempts to cancel the interfering signal in the received signal, the UE needs to cancel the interfering signal on all PRSs assigned to the UE if the desired signal is assigned two consecutive PRBs, and the interfering signal A is assigned four consecutive PRBs. On the other hand, if the desired signal is assigned four consecutive PRBs, and interfering signal A is assigned two consecutive PRBs, the UE may not cancel the interfering signal as in the previous case since it cannot be ensured without assistance information that the interfering signal A is identically present on all PRBs assigned to the UE.

Accordingly, unless resource allocation information on the interfering signal is not directly delivered, granularity for causing the UE to perform interference cancellation needs to be agreed upon between eNBs. This granularity should be granularity of resource allocation for one UE. Preferably, the PRB bundling size should be equal to the granularity for interference cancellation. That is, the UE may be assigned resources in the serving cell in a PRB bundling unit, and may perform IC on a resource assigned thereto on the assumption that resource allocation in a neighboring cell is performed in the same PRB bundling unit. In this case, an agreement on the PRB bundling size and resource allocation needs to be made between eNBs.

A specific RS sequence may assume PRB bundling, while another RS sequence is not allowed to assume PRB bundling. In other words, whether or not PRB bundling can be assumed may be determined for each RS sequence. That is, when the eNB provides information about a DM-RS of the interfering signal as shown in Table 6, whether or not PRB bundling can be assumed for each DM-RS sequence may also be signaled to the UE.

For the UE to perform interference cancellation in the PRB bundling unit, it should be assumed that the same channel is maintained for the interfering signal within the bundled PRBs. Accordingly, resource allocation should be performed in a localized manner rather than in a distributed manner within the bundled PRBs, and only when the UE is aware of this information, the UE may perform IC within the specific bundled PRBs allocated in the localized manner. The UE may not perform IC on bundled PRBs allocated in the distributed manner. Accordingly, in performing resource allocation between eNBs, cooperation needs to be pre-implemented between eNBs such that resources are allocated in the distributed manner in a specific frequency domain and allocated in the localized manner in another specific frequency domain.

The PRB bundling size may be variable. Resources may be allocated in M PRB bundling units in a specific subframe, and allocated in N PRB bundling units in another specific subframe. Alternatively, resources may be allocated in M PRB bundling units in a specific subframe and allocated in a PRB unit in another specific subframe.

2-1-4. HetNet Support

When the aforementioned information of the present disclosure is provided to the UE to cancel the interfering signal in a heterogeneous network (HetNet), additional information for interference cancellation may be provided. That is, if a macro eNB operates an almost blank subframe (ABS), a specific micro eNB may determine whether PDSCH is performed according to the ABS pattern of the micro eNB. If the PDSCH is transmitted at a low transmit power in the ABS, the corresponding signal is unlikely to operate as a dominant interferer for a neighboring pico UE. Accordingly, interference candidate groups may be divided according to the ABS pattern as shown Table 6 and signaled to the UE.

For example, a plurality of subframe sets may be signaled to the pico UE, and interference candidate groups may be divided according to the respective subframe sets. An interference candidate group refers to information listed in Table 6. Information as shown in Table 6 may be signaled for each subframe set. Alternatively, the micro eNB may signal information shown in Table 6 only for a subframe set corresponding to the ABS.

All or some of the information described above in item 2.1 and later items may be provided to the target UE.

2-2. CRS-Based Signal Acting as Interfering Signal

Hereinafter, description will be given of information that the network needs to signal to allow the target UE to cancel a CRS-based PDSCH acting as the interfering signal in a received signal. Since the interfering signal is a CRS-based PDSCH, the seed value of the CRS sequence primarily needs to be identified. The seed value is a physical cell ID of a cell transmitting the CRS causing interference. Additionally, the UE needs to identify an MBSFN subframe configuration in order to know the number of CRS ports, positions of the CRS ports, information about presence/absence of the CRS, a transmission scheme in a subframe having no CRS and RS information.

In addition, the transmit power of the CRS may differ from the actual PDSCH transmit power, and accordingly a ratio of PDSCH transmit power to CRS transmit power also needs to be signaled to the target UE. Ratios of PDSCH transmit power to CRS transmit power on both a symbol on which the CRS is transmitted and a symbol on which the CRS is not transmitted need to be signaled.

When the physical cell ID of a cell transmitting the CRS, the number of CRS ports, positions of the CRS ports, and information about presence/absence of the CRS as mentioned above are referred to as "CRS-related information", the target UE may estimate an interfering signal channel using the signaled CRS-related information, and determine whether or not signaled CRS-based PDSCH interference is actually present, using the ratio of PDSCH transmit power to CRS transmit power.

When the interfering signal is a CRS-based PDSCH, one piece of information that the UE needing to cancel interfering signal must know is a transmitted precoding matrix index (TPMI) used for transmission of the interfering signal. However, it is difficult to provide TPMI, which dynamically changes according to the channel state in every subframe. Fixing the TPMI of a specific UE is undesirable since it may degrade performance of the UE. In addition, the target UE may be overloaded if the target UE is caused to search, in a blind manner, a PMI which an interfering UE is actually using (to transmit an interfering signal) among all PMIs. Accordingly, the PMI of the interfering UE may be restricted without excessively degrading performance of the interfering UE.

In this context, a codebook subset restriction may be applied. For example, a restriction may be applied such that a specific UE uses only some PMs among all 16 PMs to perform reporting. At the same time, this information may be delivered to the target UE such that the target UE cancels the interfering signal by detecting a TPMI in a blind manner for the PMs except the PMs use of which is restricted for the interfering UE in the codebook (namely for a set of PMs which the interfering UE is allowed to use).

That is, by providing the codebook subset restriction information, candidates of the TPMI used by the interfering UE are announced. Thereby, the rank of the interfering UE may also be restricted. Separately, rank restriction information on the interfering UE or interfering signal may be explicitly provided. Details of the rank restriction information, PDSCH start symbol index, modulation order (or MCS level) restriction information and HetNet are the same as disclosed in 2-1. DM-RS-Based Signal Acting as Interfering signal.

Additionally, even if the interfering signal is a CRS-based PDSCH, the transmission mode (TM) information on a dominant interfering UE may be delivered to signal a PDSCH transmission scheme.

The following table shows examples of information which may be signaled to the target UE when the interfering signal is a CRS-based signal.

In addition, to cancel CRS-based PDSCH interference, it should be assumed that the TPMI of the interfering signal is invariable in units of the frequency domain in which the target UE attempts to cancel interference. Preferably, a subband size that the target UE uses in performing CQI reporting should be equal to the size of a frequency domain in which interference cancellation is performed. That is, a PMI is determined in a subband unit when a serving cell allocates resources to a target UE, and a unit in which the same PMI is maintained when a neighboring cell allocates resources to an interfering UE should be determined as the subband. Accordingly, the target UE may perform interference cancellation in a frequency domain assigned thereto on the assumption that the subband size of the target UE is equal to that of the interfering UE. In this case, agreement on the subband size and resource allocation should be pre-made between eNBs.

TABLE 8

| | | | CRS information | | | | | |
|---|---|---|---|---|---|---|---|---|
| Bit value | TM (Transmission Mode) of interfering UE | PCID (Physical Cell ID) | CRS information (CRSPortsNumber, FrequencyShift, MBSFNsubframe pattern) | CRS to PDSCH power ratio | TPMI or codebook subset restriction | Rank Restriction | PDSCH starting Symbol index | Modulation order restriction |
| 0 | TM 2 | PCID(0) | _PortNum0, _Freqshift0, _MBSFN_ subframe_0 | $\rho_A(0)$, $\rho_B(0)$, | | | 2 | — |
| 1 | TM 3 | PCID(1) | _PortNum1, _Freqshift1, _MBSFN_ subframe_1 | $\rho_A(1)$, $\rho_B(1)$, | 01 | 1 | 1 | 2 |
| 2 | TM 4 | PCID(2) | _PortNum1, _Freqshift1, _MBSFN_ subframe_1 | $\rho_A(0)$, $\rho_B(0)$, | 0000 . . . 1111 | 2 | 3 | 4 |
| . . . | | | | | | | | |

2-2-1. CRS Sequence Search Procedure

In canceling a CRS-based interfering signal, the UE needs to measure and monitor a CRS of a neighboring cell on a long-term basis. In detecting a CRS-based interfering signal, a UE receiving CRS-related information of a specific cell as shown in Table 8 may determine that PDSCH using a CRS is likely to act as interference only when the reception signal strength of the CRS is higher than or equal to a certain level, and use only a CRS whose reception signal strength is greater than or equal to a specific value to estimate the channel of an interfering signal and cancel the interfering signal.

2-2-2. Subband Size Alignment

In receiving information assisting in interference cancellation to cancel an interfering signal in the received signal, the subband size alignment of the interfering signal needs to be additionally considered. In other words, a frequency domain assigned the desired signal and a frequency domain assigned the interfering signal need to be taken into consideration. Unless resource allocation information on the interfering signal is not directly delivered, granularity for causing the target UE to perform interference cancellation needs to be agreed upon between eNBs. This granularity should be granularity of resource allocation for one UE.

Similarly, PRB grouping may be performed in a unit in which the same TPMI is maintained. The TPMI of the interfering UE is maintained to be the same as the TPMI of the target UE within the PRB grouping. Information on how many PRBs are grouped for the aforementioned purpose should be pre-agreed upon between eNBs.

All or some of the information described above in item 2.2 and later items may be provided to the target UE.

2-3. When DM-RS-Based Signal and CRS-Based Signal Coexist as Interfering Signals In reality, DM-RS-based PDSCH and CRS-based PDSCH coexist as interfering signals for the target UE. To cancel an interfering signal in a received signal, the target UE needs to determine whether a signal is a DM-RS-based PDSCH or a CRS-based PDSCH, and estimate the amount of interference in the received signal and cancel the interference in the received signal based on the determination.

Hereinafter, description will be given of information that the network needs to provide and an operation of the UE in the case of coexistence of the DM-RS-based PDSCH and the CRS-based PDSCH. The following table contains information described in Tables 6 and 8, and description thereof will be given with reference to descriptions of Tables 6 and 8 given above.

TABLE 9

| | | CRS information | | | | | DM-RS information | |
|---|---|---|---|---|---|---|---|---|
| Bit value | TM (Transmission Mode) of interfering UE | PCID (Physical Cell ID) | CRS information (CRSPortsNumber, FrequencyShift, MBSFNsubframe pattern) | CRS to PDSCH power ratio | TPMI or codebook subset restriction | Rank Restriction | VCID (virtual cell ID) $\in \{0, 1, 2, \ldots, 503\}$ | nSCID $\in \{0, 1\}$ |
| 0 | TM 4 | PCID(0) | _PortNum0, _Freqshift0, _MBSFN_ subframe_0 | $\rho_A(0)$, $\rho_B(0)$, | 0000 ... 1111 | 2 | — | — |
| 1 | TM 10 | | _PortNum1, _Freqshift1, _MBSFN_ subframe_1 | $\rho_A(1)$, $\rho_B(1)$, | — | 4 | nVCID(1) | {0} |
| 2 | TM 10 | PCID(2) | _PortNum2, _Freqshift2, _MBSFN_ subframe_2 | $\rho_A(2)$, $\rho_B(2)$, | | | nVCID(2) | {0} |
| ... | | | | | | | ... | ... |

| | QCL assumption | | Rate-matching information | | | | | |
|---|---|---|---|---|---|---|---|---|
| | | | | | CRS information | | | |
| Bit value | (non-zero power) CSI-RS index | PCID (Physical Cell ID) | NZP CSI-RS index | ZP CSI-RS index | (CRSPortsNumber, FrequencyShift, MBSFNsubframe pattern) | | PDSCH starting Symbol index | Modulation order restriction |
| 0 | — | nPCID(0) | — | — | PortNum0, Freqshift0, MBSFN_ subframe_0 | | 2 | — |
| 1 | qcl- CSI-RS index(1) | | CSI-RS index(1) | ZP CSI-RS (1) | _PortNum1, _Freqshift1, _MBSFN_ subframe_1 | | 1 | 2 |
| 2 | | nPCID(2) | | | _PortNum2, _Freqshift2, _MBSFN_ subframe_2 | | 3 | 4 |
| ... | ... | | | | ... | | | |

Table 9 lists information that needs to be provided to the target UE when an RS used to modulate an interfering signal is unidentifiable. First, the eNB uses a signaled TM to signal whether the interfering signal is a CRS-based PDSCH or a DM-RS-based PDSCH. In addition, the transmission scheme for the interfering signal may be recognized according to the signaled TM.

In the case of a CRS-based TM (e.g., TM 4), the eNB provides CRS-related information. Preferably, DM-RS-related information is not provided in this case. That is, in the CRS-based TM, QCL assumption is not necessary, and thus information thereon is omitted.

In the case of a DM-RS-based TM (e.g., TM 10), the eNB may not only provide CRS-related information but also DM-RS-related information.

The target UE receives information as shown in Table 9, and CRS is transmitted irrespective of transmission of PDSCH in canceling the interfering signal. Accordingly, the target UE detects a DM-RS sequence using a given TM first in a blind manner, assuming that there is a DM-RS-based PDSCH. Thereafter, when it is determined that the DM-RS interfering signal is present, or when a DM-RS-based interfering signal is canceled, the target UE estimates a CRS-based interfering signal.

Figure 6:
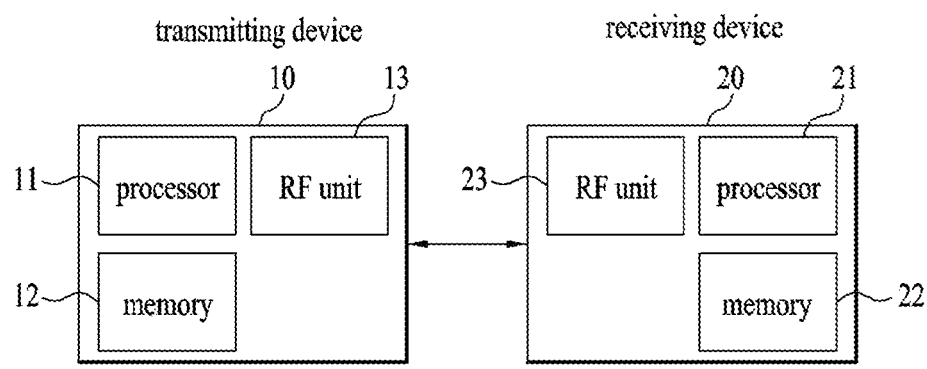
FIG. 6 is a diagram of apparatuses for implementing one or more embodiments of the present invention.

FIG. 6 is a block diagram of a transmitting device 10 and a receiving device 20 configured to implement exemplary embodiments of the present invention. Referring to FIG. 6, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a terminal, a relay, a base station, or other devices.

The invention claimed is:

1. A method for supporting, by a serving cell, cancellation of an interfering signal in a received signal for a target terminal in a wireless communication system, the method comprising:
   receiving, from a neighboring cell, scheduling information of the neighboring cell;
   configuring a set of assistance information for cancellation of the interfering signal for the target terminal based on the scheduling information of the neighboring cell; and
   transmitting, to the target terminal, the set of assistance information for cancellation of the interfering signal for the target terminal,
   wherein the set of assistance information comprises an MBSFN (multimedia broadcast single subframe network) subframe pattern for the interfering signal, a ratio of a transmission power of a physical downlink shared channel (PDSCH) to a transmission power of a cell-specific reference signal (CRS) for the interfering signal, a transmission mode related to the interfering signal, and a resource allocation granularity of the neighboring cell indicating a number of physical resource blocks (PRBs) in which the same precoding is used for the interfering signal.

2. The method according to claim 1, wherein the set of assistance information further comprises at least one of precoding matrix information used in transmitting the interfering signal, rank information, information about an index of a physical downlink shared channel (PDSCH) starting symbol of the interfering signal, and a modulation order or modulation and coding scheme (MCS) level information of the interfering signal.

3. The method according to claim 1, wherein the set of assistance information further comprises physical downlink shared channel (PDSCH) resource element (RE) mapping information of the interfering signal.

4. The method according to claim 1, wherein the set of assistance information further comprises an almost blank subframe (ABS) pattern of the neighboring cell, and
   wherein the set of assistance information is valid only for at least one subframe indicated by the ABS pattern when the assistance information comprises the ABS pattern of the neighboring cell.

5. The method according to claim 1, wherein the serving cell has the same system bandwidth as a system bandwidth of the neighboring cell.

6. A method for canceling, by a terminal, an interfering signal in a received signal in a wireless communication system, the method comprising:

receiving, from a serving cell, a set of assistance information for cancellation of an interfering signal from a neighboring cell; and canceling the interfering signal in the received signal based on the set of assistance information, wherein the set of assistance information comprises an MBSFN (multimedia broadcast single subframe network) subframe pattern for the interfering signal, a ratio of a transmission power of a physical downlink shared channel (PDSCH) to a transmission power of a cell-specific reference signal (CRS) for the interfering signal, a transmission mode related to the interfering signal, and a resource allocation granularity of the neighboring cell indicating a number of physical resource blocks (PRBs) in which the same precoding is used for the interfering signal.

7. The method according to claim 6, wherein the set of assistance information further comprises at least one of precoding matrix information used in transmitting the interfering signal, rank information, information about an index of a physical downlink shared channel (PDSCH) starting symbol of the interfering signal, and a modulation order or modulation and coding scheme (MCS) level information of the interfering signal.

8. The method according to claim 6, wherein the set of assistance information further comprises physical downlink shared channel (PDSCH) resource element (RE) mapping information of the interfering signal.

9. The method according to claim 6, wherein the set of assistance information further comprises an almost blank subframe (ABS) pattern of the neighboring cell, and wherein the set of assistance information is valid only for at least one subframe indicated by the ABS pattern when the assistance information comprises the ABS pattern of the neighboring cell.

10. The method according to claim 6, wherein the serving cell has the same system bandwidth as a system bandwidth of the neighboring cell.

11. A terminal that cancels an interfering signal in a received signal in a wireless communication system, the terminal comprising:

a receiver and a transmitter; and a processor, operatively coupled to the receiver and the transmitter, wherein the processor is configured to:

control the receiver to receive, from a serving cell, a set of assistance information for cancellation of an interfering signal from a neighboring cell, and cancel the interfering signal in the received signal based on the set of assistance information, wherein the set of assistance information comprises an MBSFN (multimedia broadcast single subframe network) subframe pattern for the interfering signal, a ratio of a transmission power of a physical downlink shared channel (PDSCH) to a transmission power of a cell-specific reference signal (CRS) for the interfering signal, a transmission mode related to the interfering signal, and a resource allocation granularity of the neighboring cell indicating a number of physical resource blocks (PRBs) in which the same precoding is used for the interfering signal.

* * * * *